April 18, 1939.  M. M. SAFFORD  2,155,243
ELECTRICAL CABLE
Filed May 9, 1936
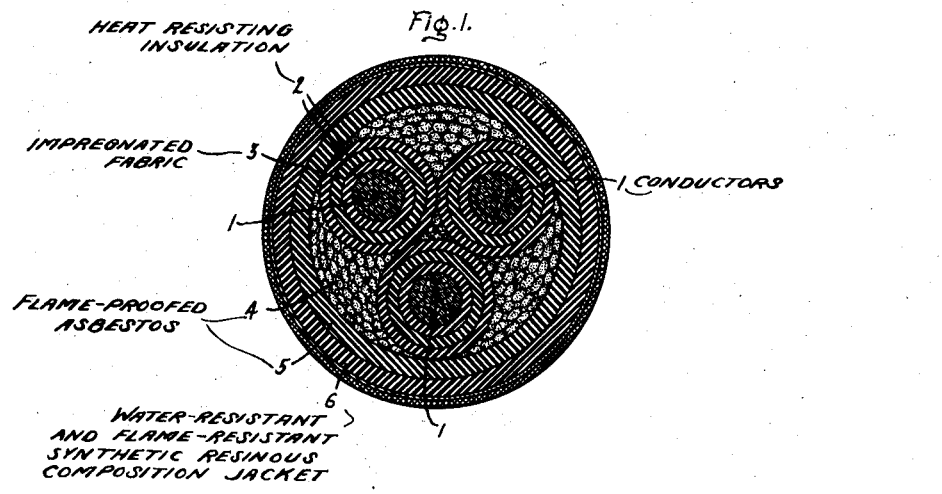
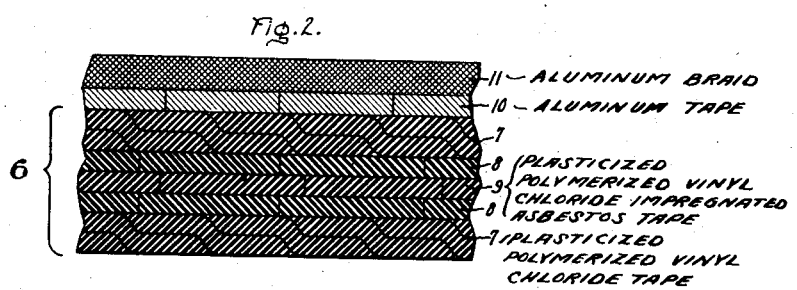
Inventor:
Moyer M. Safford,
by Harry E. Dunham
His Attorney.

Patented Apr. 18, 1939

2,155,243

UNITED STATES PATENT OFFICE 2,155,243

ELECTRICAL CABLE

Moyer M. Safford, Schenectady, N. Y., assignor to General Electric Company, a corporation of New York Application May 9, 1936, Serial No. 78,815

8 Claims. (Cl. 174—106)

The present invention relates to electrical cables and more particularly to electrical cables which are provided with insulation which is water-resistant, flame-resistant, and capable of withstanding for a prolonged time a continuous elevated temperature of the order of 100° C.

Electrical cables ordinarily must be constructed in such manner as to provide adequate insulation which will protect the cable under voltage stress. In addition, where the cable is to be used under conditions of more or less continuous heat, as in boiler or engine rooms, for example, it must be of such construction as to insure heat-resistance and flame-resistance especially where the cable is liable to be subjected to intense heat. Moreover, where the cable is to be used in places, for example, subways, where it is apt to come in contact with or be submerged in water, the insulation on the cable must be water impervious or at least provided with an exterior jacket or sheath which is water-impervious, and the insulation construction should be such that the cable structure does not act like a wick to transmit water along its length.

In addition to the important property of water-resistance, the insulation on the cable must be so constructed that it is flame-resistant even under conditions of prolonged intense heat. One particularly important property of the insulation construction should be its resistance to travel of the flame along the length of the cable in case it is temporarily ignited under such conditions. The insulation should be of such character as to withstand intense heat but if ignited at a point it should be capable of extinguishing itself before the flame has traveled any appreciable length along the cable.

My invention provides a cable construction which embodies electrical insulation fulfilling all of the requirements above set forth.

In accordance with my invention I provide a cable construction wherein the conductors are first insulated with composite insulation comprising a heat-resisting insulation, such as asbestos, spun glass and the like, preferably in combination with a coated and impregnated fibrous material such as varnished cambric or other suitable coated and impregnated fibrous material, the impregnant being a good dielectric and including, if desired, such compositions as are mentioned for use in the jacket for the cable which is placed over the insulated conductors, as more fully described hereinafter. The jacket which is of special construction embodies a water-resistant and flame-resistant composition, which is, briefly, a composition comprising a plasticized polymerized vinyl halide and is placed over the insulated conductors, as stated, and in turn is covered or sheathed with a metal foil tape and metal braid, the metal being preferably aluminum.

My improved cable construction will now be more fully described in connection with the accompanying drawing which forms part of the present application. In said drawing, Fig. 1 is a diagrammatic cross-section of a cable construction in accordance with the invention; and Fig. 2 is an enlarged diagrammatic section through a portion of the outer coverings of the cable, showing in detail a manner of construction of the same.

Referring to Fig. 1 of the drawing, a multi-conductor type of cable is shown wherein each conductor 1 is made up of a plurality of stranded wires. In this particular case, each conductor consists of sixty-one 0.051" diameter tinned copper wires stranded and made up to an area of 150,000 circular mils. Immediately surrounding each conductor is a wall 2 of a heat resisting insulation, such as felted asbestos, in this particular case being 43 mils thick. Over the wall of felted asbestos is a wall 3 of impregnated fabric, such as varnished cambric which in the present case is 45 mils thick. A second wall 2 of felted asbestos is provided over the wall 3 of varnished cambric.

The three conductors insulated as described are stranded together with asbestos roving 4 in the filler spaces saturated with a suitable flame-proofing compound such as, for example, chlorinated naphthalene, and then covered with a wall or belt 5 of felted asbestos impregnated with a suitable flame-proofing compound. In the instant case, a 70 mil wall or belt of such felted asbestos is satisfactory.

Applied over the asbestos wall or belt 5 is a jacket or sheath, designated generally 6, formed or constructed as will be now more in detail pointed out in connection with Fig. 2 of the drawing. The jacket 6 comprises a plurality of layers of tape formed from a composition comprising a plasticized polymerized vinyl halide, for example, a plasticized polymerized vinyl chloride, and sandwiched between said layers is a layer of asbestos tape impregnated with such composition. Such compositions may be prepared, for example, by plasticizing polymerized vinyl chloride with suitable plasticizers such as tricresyl phosphate, as outlined in Semon Patent 1,929,453 of October 10, 1933. Such compositions may and preferably do contain in addition to the plasticizer, other ingredients which improve its electrical properties and make it suitable for use at higher voltages. For example, a composition may be used comprising polymerized vinyl chloride, tricresyl phosphate, an oxide of lead (PbO) and finely divided carbon black, as more fully described in the application of Moyer M. Safford, Serial No. 67,639, filed March 7, 1936, which has matured to Patent No. 2,118,017, dated May 17, 1938, and assigned to the assignee of the present invention.

The plasticized polymerized vinyl chloride composition is preferably dissolved in a suitable solvent, such as monochlorbenzene. A solution containing 20% solid content of polymerized vinyl chloride is suitable and the degree of flexibility in the asbestos tape can be governed by the amount of plasticizer added to the polymerized vinyl chloride before it is put into solution by the solvent. Preferably, if the polymerized vinyl chloride is to be compounded with other ingredients, such as lead oxide and carbon black, this is done before it is put into solution for impregnation of the asbestos tape.

Polymerized vinyl chloride plasticized with about 35 to 40% tricresyl phosphate has been found satisfactory for use in impregnating the asbestos tape.

One layer 7 of plasticized polymerized vinyl chloride tape of suitable dimensions, in the present construction about 1¾" in width and 10 mils thick is first wound, half lap, over the asbestos wall or belt 5; then a layer 8 of such tape is wound, butt lap, over layer 7. On layer 8, there is next wound, butt lap, a layer 9 of 1½" wide plasticized polymerized vinyl chloride impregnated asbestos tape. This process is repeated in the reverse order with respect to layers 7 and 8 as shown in detail in Fig. 2.

On outermost layer 7 is then wound a layer 10, slightly lapped, of annealed aluminum foil tape which in the present case is 1 to 2 mils thick and ¾" to 2" wide, and the aluminum tape is then tightly braided with an aluminum braid armoring 11 which is formed in the present construction from approximately 12.6 mil wire braided from a braiding machine having 24 spools to the head and carrying 15 strands of wire to the spool.

The braided cable is then heated for approximately two hours at 150° C. This heat treatment serves to weld the layers of plasticized polymerized vinyl chloride composition into a homogeneous solid mass of water-resistant, flame-resistant, and heat-resistant insulation. The aluminum foil keeps the plasticized polymerized vinyl chloride composition in place and acts to prevent it from oozing out between the strands of the aluminum braid, thus preventing from forming focal spots for possible ignition of the compound when subjected to intense heat or flame. The combination of aluminum tape and aluminum braid is for this reason highly important since when subjected to intense heat there is no danger of any of the temporarily softened plasticized polymerized vinyl chloride composition extruding through the braid and depositing on the outside thereof in contact with any flame which may be in close proximity at the time.

A cable of the character described is rugged in character, mechanically strong, of high dielectric strength and completely impervious to water. Moreover, it is resistant to heat and flame and if it should be ignited at any point will extinguish itself in a very short time so that there is no danger of the flame travelling along the cable length, thus reducing fire hazard to a minimum.

It is to be understood that the specific figures given above with reference to the size, dimension, etc. of the various parts making up the cable of the present invention, are illustrative in character. Obviously, larger or small parts may be used, depending upon the size of the finished cable. Similarly, the temperature-time treatment will vary with the size of the cable and the amount and nature of the insulation used as will be obvious to those skilled in the art. Moreover, while the tape and braid have been specified as being made of aluminum, since this metal is at present preferred, suitable equivalents of aluminum for the purpose specified are included within the scope of the invention.

What I claim as new and desire to secure by Letters Patent of the United States is:

1. An electrical cable, comprising an electrical conductor insulated with a heat-resisting insulation, said insulation being jacketed with a jacket comprising a water-resistant, heat-resistant, and flame-resistant synthetic resinous composition, a covering of metallic tape on said jacket and a metallic braid on said tape.

2. An electrical cable comprising multiple electrical conductors individually insulated with insulation comprising asbestos, insulation in the filler spaces comprising asbestos roving, a sheath of insulation over the united conductors, a jacket of composition comprising plasticized polymerized vinyl chloride over said sheath, and a protective covering of metallic tape on said jacket and a metallic braid over said tape.

3. An electrical cable of the multiple conductor type wherein the individual electrical conductors are insulated and sheathed with insulation comprising asbestos and varnished cambric, an exterior jacket on said insulation comprising a composition comprising polymerized vinyl chloride and plasticizer, and a protective covering on said jacket of aluminum tape and aluminum braid, said aluminum tape being adjacent to the outer surface of said jacket.

4. An electrical cable comprising multiple electrical conductors individually insulated with insulation comprising layers of asbestos and varnished cambric, asbestos roving in the filler spaces, a belt of asbestos impregnated with a flameproofing compound surrounding said insulation and roving, a jacket of insulation on said asbestos belt composed of a composition comprising polymerized vinyl chloride, tricresyl phosphate, lead oxide and finely divided carbon black, and a protective covering on said jacket consisting of an inner layer of aluminum tape and an outer layer of aluminum braid.

5. A multi-conductor electrical cable comprising a plurality of electrical conductors each insulated with layers of asbestos and varnished cambric, asbestos roving saturated with a flameproofing compound in the filler spaces, a belt of asbestos over said roving and conductors, impregnated with a flameproofing compound, a jacket of insulation over said belt of asbestos comprising a plurality of layers of tape including a plasticized polymerized vinyl chloride composition and asbestos tape impregnated with such composition, aluminum foil tape surrounding the outer wall of said jacket and a protective braid of aluminum wire on said tape.

6. The method of making a cable which comprises surrounding each of a plurality of electrical conductors with a wall of felted asbestos, covering said wall of asbestos with a wall of varnished cambric and in turn covering the latter with a wall of felted asbestos, stranding together the conductors so insulated with asbestos roving in the filler spaces and covering the conductors so stranded together with a belt of felted asbestos, jacketing the latter with a jacket of insulation comprising plasticized polymerized vinyl chloride as follows: applying half-lap a layer of plasticized polymerized vinyl chloride tape over the asbestos wall, then a layer butt-lap, of such tape over the first layer, then a layer, butt-lap, of asbestos tape impregnated with plasticized polymerized vinyl chloride over said second layer, reversing the process of application of the first two layers for the next two layers; applying a layer of aluminum foil tape over the last layer, applying an aluminum braid over said aluminum tape, and heating the cable so insulated at about 150° C. for about two hours.

7. The method of making an electrical cable which comprises insulating a plurality of electrical conductors with insulation including asbestos, stranding said conductors together with asbestos roving in the filler spaces, suitably impregnated with a flameproofing compound, jacketing said conductors so stranded together with a jacket of insulation comprising placticized polymerized vinyl chloride composition, wrapping an aluminum tape over said jacket, applying an aluminum braid over said tape, and heating the braided cable at an elevated temperature for a time sufficient to weld together the insulation composition layers of said jacket.

8. The method of making an electrical cable which comprises applying to an insulated electrical conductor provided with a heat-resisting insulation, a jacket comprising a plurality of layers of water-resistant, heat-resistant, and flame-resistant synthetic resinous composition, taping said jacket with a metallic tape, braiding the outer surface of the cable so constructed with a metallic braid, and heating the braided cable at an elevated temperature for a time sufficient to weld together the composition of said jacket into a homogeneous solid mass.

MOYER M. SAFFORD.